Feb. 24, 1970  V. K. ELORANTA  3,496,850
PHOTOGRAPHIC APPARATUS

Filed July 25, 1967  2 Sheets-Sheet 1

INVENTOR.
Vaito K. Eloranta
BY Brown and Mikulka
and
Leonard S. Selman
ATTORNEYS

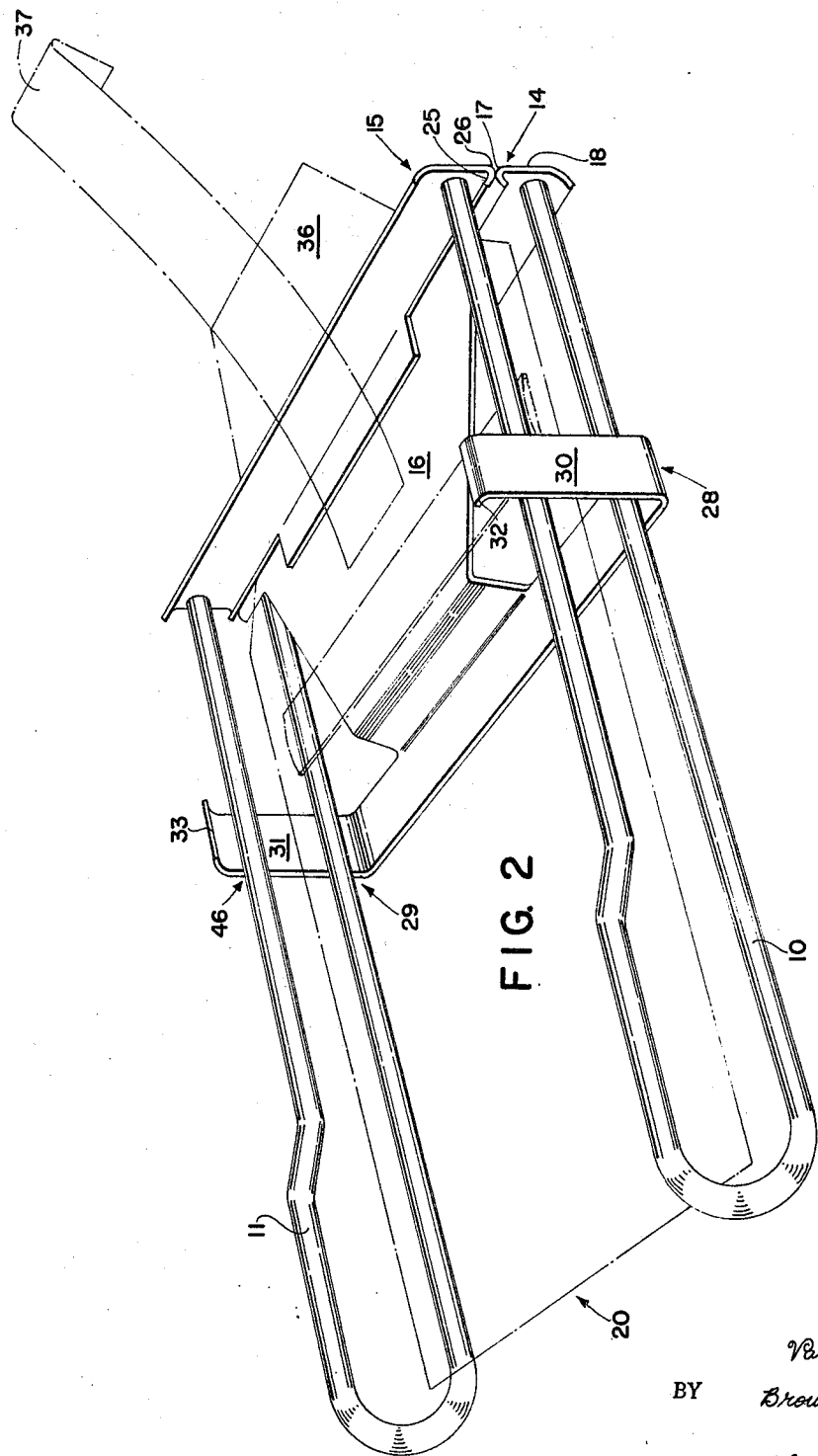

United States Patent Office 3,496,850
Patented Feb. 24, 1970

3,496,850
PHOTOGRAPHIC APPARATUS
Vaito K. Eloranta, Needham, Mass., assignor to Polaroid Corporation, Cambridge, Mass., a corporation of Delaware
Filed July 25, 1967, Ser. No. 655,833
Int. Cl. G03b 17/52
U.S. Cl. 95—13                                                9 Claims

ABSTRACT OF THE DISCLOSURE

A photographic processing apparatus in which a pair of cantilever springs are attached to opposite ends of a pair of rigid spreader members. The spreader members being utilized for distributing a processing liquid between a pair of superposed photographic sheets. To prevent the springs from being overstressed or laterally misaligned, a restraining device is attached to a portion of the spreader body. This device is primarily designed for the protection of the spring members when the spreader members are cleaned.

Cross reference to related applications

The invention disclosed herein is related to the subject matter disclosed in copending applications; Ser. No. 655,-831, filed July 25, 1967; Ser. No. 655,834, filed July 25, 1967; Ser. No. 655,835, filed July 25, 1964; and Ser. No. 655,832, filed July 25, 1967, assigned to the same assignee.

Summary of the invention

The present invention is directed to a device which may be incorporated in a self-developing camera wherein a photographic transfer image is produced by moving a pair of film sheets including an exposed negative photosensitive sheet and a superposed positive receiving sheet, between a pair of juxtaposed pressure-applying members for distributing a processing liquid or developer between and in contact with the sheets. The preferred embodiment of the invention as disclosed herein provides a narrow gap between a pair of spring mounted sheet metal members through which the sheets are moved while the liquid introduced between the sheets is spread uniformly between and in contact with the entire facing surfaces of the sheets in a direction opposite the movement of the sheets relative to the pressure-applying sheet metal members. The present invention is concerned with a means to maintain the sheet metal members in their properly aligned juxtaposed position and to maintain the proper stress in the springs supporting said members.

The spreader system which incorporates the present invention has many advanced features including its integral precise construction resulting in important savings in cost of manufacture, its compactness and lightweight and its removability from the photographic cameras designed for its use therewith. The preferred embodiment of the spreading apparatus includes a pair of sheet metal spreader members which are permanently joined to a pair of springs which serve the dual function of supporting the spreader members in exactly aligned juxtaposed relation to one another and further to urge said spreader members toward each other with enough force to provide a uniform spread of processing liquid between the photographic sheets as they travel through the narrow gap between the spreader members. The spring force applied to the spreader members must be carefully controlled to assure satisfactory performance. Once the springs are pre-stressed during manufacture to exert a predetermined initial force, this state must be maintained. Further, the alignment of the spreader members which are welded to the springs must be as exact as possible to assure that the forces are applied properly to the sheets passing through the gap. The restraining means of the present invention as conceived and developed achieve in a simple structure these two important functions of alignment and spring force control.

Accordingly, it is an object of this invention to provide an improved spreading device including a pair of spreader members having straight parallel adjacent portions juxtaposed to form a narrow pressure-generating gap, spring means for urging the spreader members toward each other and restraining means operable to maintain a constant spring force exerted by the spring members.

It is a further object of this invention to provide such an improved spreading device that has few parts, is relatively low in cost of manufacture, is compact and lightweight yet will perform in an entirely satisfactory manner.

The invention accordingly comprises the apparatus possessing the construction, combination of elements and arrangements of parts which are exemplified in the following detailed disclosure, and the scope of the application of which will be indicated in the claims.

Brief description of the drawing

FIG. 2 is a perspective view of the apparatus embodying the invention removed from the camera and including the sheet metal spring mounted spreader members and the restraining means integral with the sheet supporting platform; and FIG. 3 is a front view of the apparatus showing the gap between the spreader members.

Description of the preferred embodiment

Figure 1:
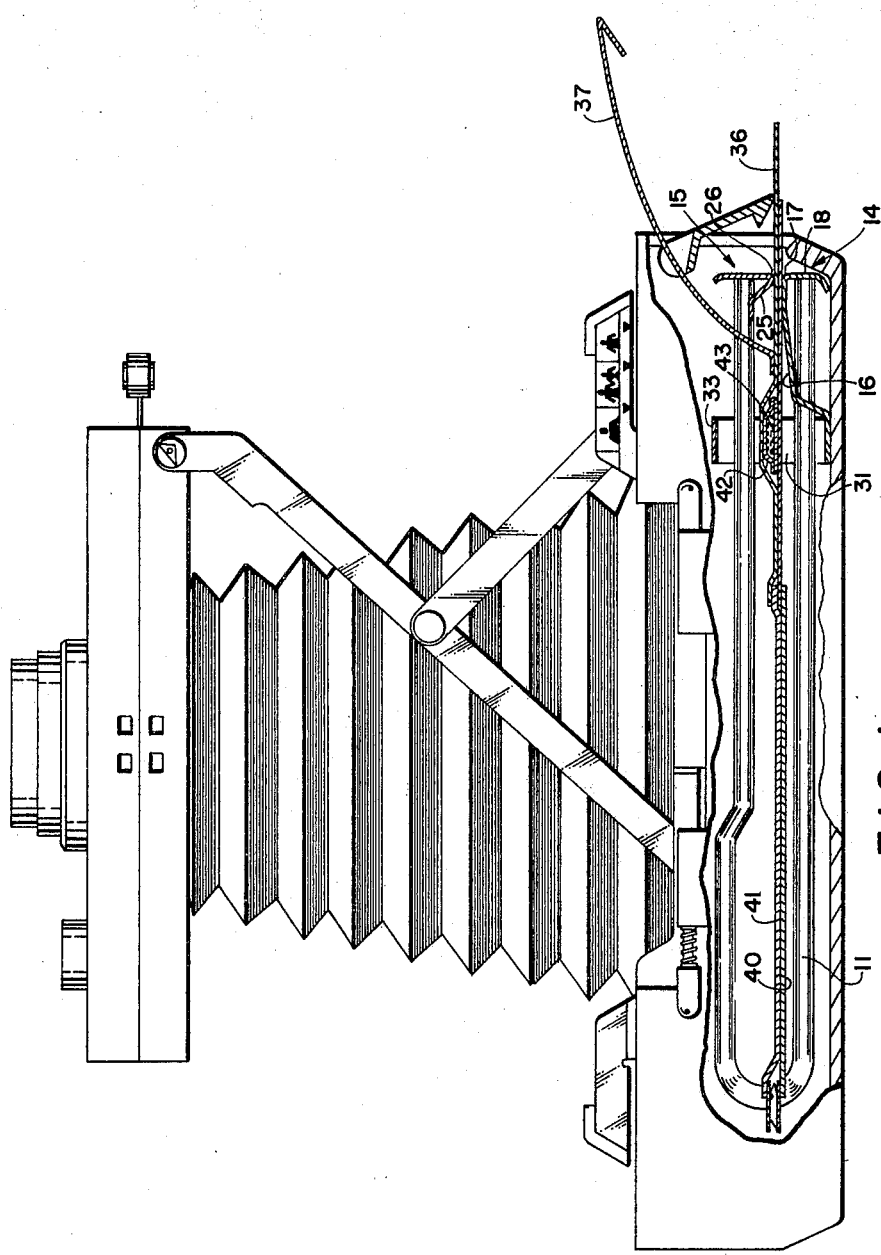
FIGURE 1 is a side elevational view of a camera having mounted within and shown in cross section the preferred embodiment of the invention including the spring mounted spreader members and the restraining means.

The spreading of a fluid composition in a uniformly thin layer between a pair of superposed sheets may be employed for effecting a number of various photographic processes and is particularly adapted, for example, to the processing of an exposed photosensitive stratum on one of the sheets to develop a latent image in the photosensitive stratum and/or produce a positive image in the other sheet by diffusion and transfer or reagents from the photosensitive stratum through or into the fluid layer. The present invention is concerned with the provisions of a spreading device adapted to be employed, for example, with a film unit comprising a first sheet having a photosensitive surface stratum and a second sheet superposed with the first sheet and having a surface stratum disposed adjacent the photosensitive stratum and adapted to receive a positive photographic image. The processing fluid may be supplied in a pod interposed between the sheets of the film unit and adapted to be moved through the gap between the sheets of the film unit and adapted to be moved through the gap between the pressure members so as to rupture the pod and distribute its contents between the sheets.

As previously stated, the forces exerted by the pressure members are predetermined by the pre-stressing of the supporting springs. To maintain this predetermined condition the springs must be protected against being overstressed, for example, by spreading the pressure members and springs too far apart by one wishing to clean the inner surfaces of the pressure members or by one trying to make his own "adjustment" of the spring tension or in other ways abusing the device. There is also a necessity for preventing lateral misalignment of the pressure members with one another by this type of abusive handling. The following description describes both the structure of the preferred embodiment of the spring supported pressure members and the cooperating restraining means.

FIGURES 1–3 of the drawing show the liquid distributing means of the present invention including a pair of substantially U-shaped springs 10 and 11 which serve to both support a pair of precisely formed sheet metal spreader members 14 and 15 and to urge said members toward each other. The springs are spot welded to the spreader members adjacent the outside ends thereof with great care taken to locate said welds since the forces acting on said spreader members must be applied with great accuracy to achieve a uniform spread.

One of the important features of the present invention is the shape of the spreader members 14 and 15 as they converge toward one another as shown in FIGURES 1 and 2, to form a throat through which the layers of photographic sheet material are manually drawn through. The spreader members are each formed of sheet metal which has the inherent capability of being easily bent to a desired shape. Thus, a single piece of sheet metal may be cut out and bent to form a platform 16, the small radius sheet contacting edge 17, and the support connecting portion 18. The platform 16 serves to guide and support the sheets of photographic material 20 into the gap between the spreader members. The edge 17 is formed as precisely as economically feasible to conform to the similar edge on spreader 15 to provide a uniform spread of the developer between the sheets. The support connecting portion 18 of the spreader member is bent and shaped to provide a suitable surface for welding the end of a pair of U-shaped cantilever type springs 10 and 11 to each end of the spreader member.

The other spreader member 15 also has a support connecting portion to which is welded the ends of the springs 10 and 11. This member has a back portion 25 which also helps to guide the sheets of film into the gap between the spreader members. The angle at which this back portion is bent is carefully controlled to provide a second small radius sheet contacting edge 26 which conforms to edge 17 on the spreader member 14.

As shown in FIGURES 1 and 2 the restraining means 28 and 29 are formed integrally with platform 16 and include elongated body portions 30 and 31 and bent over flange portions 32 and 33 which prevents the springs 10 and 11 from being overstressed by limiting the distance which the spring arms may be separated. The elongated body portions 30 and 31 on the outside of springs 10 and 11 prevent lateral forces on the rigid members 14 and 15 from affecting the lateral alignment of the spring arms. The restraining means 28 and 29 may, if desired, be welded to one of the spring arms to enhance the rigidity of the device. Thus, a restraining means is provided which is integral with the platform and may be stamped out at the same time and bent to shape using modern production techniques at a great saving of time and cost of manufacture.

A pair of shoulders or bumps 34 and 35, as shown in FIG. 3, are formed in one of the spreader members near the ends of the sheet contacting edge portion to pre-gap the edges apart so that the film leader 36, as shown in FIG. 2, may be manually pulled through the gap between the edges by means of the tab 37 typically heat sealed to the film leader. It should be understood that the film sheets as shown in FIGURE 1 are in processing position ready to be removed from the camera. U.S. Patent No. 2,991,702 shows a plurality of the film sheets stacked in a film pack as they are used in many of the present-day self developing cameras. In picture taking position, the negative sheet 40 with its photosensitive surface faces the open front of the film pack and the taking lens and then is pulled around and behind the positive sheet 41 by tab 37 as shown in FIGURE 1 in superposed position ready for processing. As the tab 37 pulls the leader 36 through the gap, the back portion 25 of spreader member 15 will support the leader at a position just before the gap and if the heat seals between tab 37 and the leader 36 are hard to break this support will prevent the leader from being pulled through the gap into the camera. The leader 36 is then manually grasped and the photographic material comprising the negative sheet 40 and the positive sheet 41 and the developer pod 42 is pulled through the gap whereby the pod is broken and the developer 43 is uniformly spread between the positive and negative sheets.

Thus, the present invention provides a highly effective integral spreading apparatus including not only means for affecting uniform spreads of processing liquid between the photographic sheets, but also guidance and support means for the sheets as well as means for maintaining constant alignment and spring force on the spreader members themselves.

Since certain changes may be made in the above device without departing from the scope of the invention herein involved, it is intended that all matter contained in the above description or shown in the accompanying drawing shall be interpreted as illustrative and not in a limiting sense.

I claim:

1. A device for distributing a processing liquid in a layer between two layers of sheet material, said device being adapted to use in combination with photographic apparatus from which said sheet material is withdrawn and comprising, in combination:

a pair of substantially rigid members having substantially straight parallel adjacent portions predeterminedly spaced apart to form a narrow pressure-generating gap through which said sheet material is movable in a plane, said members converging angularly toward each other to define a narrowing throat to guide said sheet material toward said narrow gap, each of said members exhibiting at the narrowest portion of said gap a sharply reduced radius of curvature to restrict the area of said members which bears on said sheet material;

spring means for urging said members toward each other comprising a pair of substantially U-shaped elongated spring elements, each spring element including a pair of resiliently connected cantilever arms fastened to respective ones of said rigid members at opposite ends of said gap, said members being so constructed as to effect the distribution of said liquid in a layer between layers of said sheet material during movement of said material through said gap; and restraining means for preventing overstressing of said spring means when the arms of said spring elements are forced apart and for preventing lateral misalignment of the spring arms and the rigid members mounted on said spring arms, said restraining means including a body portion blocking relative lateral movement between the pairs of spring arms and a flange portion extending from said body portion, said flange portion extending in blocking position relative to one of said arms to block said arm from moving more than a predetermined distance in a direction separating the pair of arms and rigid members from each other.

2. A device for distributing a processing liquid in a layer between two layers of sheet material, said device being adapted to use in combination with photographic apparatus from which said sheet material is withdrawn and comprising, in combination:

a pair of substantially rigid members having substantially straight parallel adjacent portions predeterminedly spaced apart to form a narrow pressure-generating gap through which said shet material is movable;

a pair of facing surfaces on said rigid members converging angularly toward each other to define a narrowing throat to guide said sheet material toward said narrow gap, at least one of said members exhibiting at the narrowest portion of said gap a sharply reduced radius of curvature to restrict the area of said members which bear on said sheet material and at least one of the facing surfaces forming a platform supporting and guiding the sheet material toward the narrow gap;

spring means for urging said members toward each other comprising a pair of substantially U-shaped elongated spring elements, each spring element including a pair of resiliently connected cantilever arms fastened to respective ones of said rigid members at opposite ends of said gap, said members being so constructed as to effect the distribution of said liquid in a layer between layers of said sheet material during movement of said material through said gap; and restraining means for preventing overstressing of said spring means when the arms of said spring elements are forced apart and for preventing lateral misalignment of the spring arms and the rigid members mounted on said spring arms, said restraining means including a pair of elongated body portions blocking relative lateral movement between the pairs of spring arms and a pair of flange portions extending in blocking position relative to respective ones of said pairs of spring arms to block said arms from moving more than a predetermined distance in a direction separating each pair of arms and the rigid members mounted thereon from each other.

3. The invention of claim 2 wherein the restraining means comprise a pair of members integral with and extending from said platform.

4. The invention of claim 2 wherein the restraining means comprise a pair of members integral with and extending from said platform and connected to portions of said spring means.

5. A device for distributing a processing liquid in a layer between two layers of sheet material, said device being adapted to use in combination with photographic apparatus from which said sheet material is withdrawn and comprising, in combination:

a pair of substantially rigid members having substantially straight parallel adjacent portions predeterminedly spaced apart to form a narrow pressure-generating gap through which said sheet material is movable;

a pair of facing surfaces on said rigid members converging angularly toward each other to define a narrowing throat to guide said sheet material toward said narrow gap, at least one of the facing surfaces forming a platform supporting and guiding the sheet material toward said gap;

spring means for urging said members toward each other comprising a pair of substantially U-shaped elongated spring elements, each spring element including a pair of resiliently connected cantilever arms fastened to respective ones of said rigid members at opposite ends of said gap, said members being so constructed as to effect the distribution of said liquid in a layer between layers of said sheet material during movement of said material through said gap; and restraining means for preventing overstressing of said spring means when the arms of said spring elements are forced apart and for preventing lateral misalignment of the spring arms and the rigid members mounted on said spring arms, said restraining means comprising a pair of bent elongated members extending outwardly from the rear of said platform and connected to portions of said spring means, each of said members including an elongated body portion blocking relative lateral movement between the pairs of spring arms and a flange portion extending from said elongated body portion, said flange portion extending in blocking position relative to a respective one of each of said pairs of spring arms to block said arms from moving more than a predetermined distance in a direction separating each pair of arms and the rigid members mounted thereon from each other.

6. A device for distributing a processing liquid in a layer between two layers of sheet material, said device being adapted to use in combination with photographic apparatus from which said sheet material is withdrawn and comprising, in combination:

a pair of substantially U-shaped elongated spring elements, each spring element including a pair of resiliently connected cantilever arms;

a pair of sheet metal members permanently joined to said cantilever arms, each of said members having a substantially straight edge portion which is predeterminedly spaced apart in parallel relation to the other of said edge portions to form a narrow pressure-generating gap through which said sheet material is movable, said members being so constructed as to effect the distribution of said liquid in a layer between the layers of said sheet material during movement of said material through said gap;

at least one of said sheet metal members forming an elongated platform integral with said edge portion for supporting and guiding the sheet material toward said gap, said platform having a pair of integral bent elongated members extending outwardly from the rear thereof and connected to portions of said spring elements, each of said bent elongated members including an elongated body portion blocking relative lateral movement between said pairs of spring arms and a flange portion extending from said body portion in blocking relation to respective ones of said pairs of spring arms to block said arm from moving more than a predetermined distance in a direction separating each pair of arms thereby preventing overstressing of said spring arms when the arms are forced apart.

7. Photographic apparatus for distributing a processing liquid as a layer between two layers of sheet material, comprising:

a pair of substantially rigid members having adjacent portions juxtaposed to form a narrow gap through which such sheet material is movable to effect the spreading of such liquid in a layer between the two layers of such sheet material;

resilient means for urging said members toward each other at least when such sheet material passing through said gap exerts a force on said members tending to increase the size of said gap, whereby said members are displaced away from each other by said force and said resilient means automatically returns said members to their original positions with said narrow gap therebetween upon the removal of such force; and means for contacting said resilient means whenever said spreader members have been displaced away from each other a predetermined distance widening said gap and for restraining further movement of said spreader members away from each other, such predetermined distance being selected so that the resilient characteristic of said resilient means is not adversely affected by the force exerted thereon at such time as said gap is widened to the maximum extent permitted by said contacting and restraining means.

8. The apparatus of claim 7 wherein said contacting and restraining means additionally includes means for preventing lateral misalignment of said rigid members.

9. A device for distributing a processing liquid in a layer between two layers of sheet material, said device being adapted to use in combination with photographic apparatus from which such sheet material is withdrawn and comprising, in combination:

a pair of substantially rigid members having adjacent portions predeterminedly spaced apart to form a narrow pressure-generating gap through which such sheet material is movable in a plane, said members converging angularly toward each other to define a narrowing throat to guide such sheet material toward said narrow gap;

spring means for urging said members toward each other comprising a pair of elongated cantilever spring elements fastened to respective ones of said rigid members at opposite ends of said gap, said members being so constructed as to effect a distribution of such liquid in a layer between layers of such sheet material during movement of such material through said gap; and restraining means for preventing overstressing of said spring means when said arms of said spring elements are forced apart and for preventing lateral misalignment of said spring arms and said rigid members mounted on said spring arms, said restraining means including a body portion blocking relative lateral movement between the pairs of said spring arms and a flange portion extending from said body portion, said flange extending in blocking position relative to one of said arms to block said one arm from movement more than a predetermined distance in a direction separating said pair of arms and rigid members from each other.

References Cited

UNITED STATES PATENTS

| | | | |
|---|---|---|---|
| 2,845,850 | 8/1958 | Bing et al. | 95—13 |
| 2,854,904 | 10/1958 | Bishop | 95—13 |

NORTON ANSHER, Primary Examiner

R. L. MOSES, Assistant Examiner

U.S. Cl. X.R.

95—89

UNITED STATES PATENT OFFICE
CERTIFICATE OF CORRECTION

Patent No. 3,496,850                         February 24, 1970

Vaito K. Eloranta

It is certified that error appears in the above identified patent and that said Letters Patent are hereby corrected as shown below:

Column 1, line 29, "1964" should read -- 1967 --. Column 4, line 70, "shet" should read -- sheet --.

Signed and sealed this 29th day of December 1970.

(SEAL)
Attest:

Edward M. Fletcher, Jr.                    WILLIAM E. SCHUYLER, JR.
Attesting Officer                            Commissioner of Patents